(12) United States Patent
Wanner et al.

(10) Patent No.: US 6,470,560 B1
(45) Date of Patent: Oct. 29, 2002

(54) METHOD FOR MAKING A SHAFT COUPLING WITH TAPERED SPINES FOR A PULL-TYPE FORAGE HARVESTER

(75) Inventors: John E. Wanner, Denver, PA (US); Robert A. Wagstaff, Lancaster, PA (US)

(73) Assignee: New Holland North America, Inc., Hew Holland, PA (US)

( * ) Notice: Subject to any disclaimer, the term of this patent is extended or adjusted under 35 U.S.C. 154(b) by 0 days.

(21) Appl. No.: 10/073,703

(22) Filed: Feb. 11, 2002

Related U.S. Application Data

(62) Division of application No. 09/722,963, filed on Nov. 27, 2000, now Pat. No. 6,381,933.

(51) Int. Cl.$^7$ .......................... B23P 11/00; B21D 39/04; B21D 53/60
(52) U.S. Cl. .................. 29/525.11; 29/282; 29/891; 403/395.1
(58) Field of Search .................. 29/525.11, 525.01, 29/515, 517, 234, 235, 237, 255, 282, 891; 403/359.1, 359.5; 409/10

(56) References Cited

U.S. PATENT DOCUMENTS 4,134,700 A * 1/1979 Nelson et al. ............... 403/334
4,210,372 A * 7/1980 McGee et al. .......... 308/189 R

* cited by examiner

Primary Examiner—I. Cuda-Rosenbaum
Assistant Examiner—John C. Hong
(74) Attorney, Agent, or Firm—John William Stader; Larry W. Miller

(57) ABSTRACT

The device consists of a tapered spline coupler for a drive shaft of a pull-type forage harvester. The first drive shaft and second drive shaft each have a set of tapered splines that are inserted into a tapered, internally splined coupler. A pair of retaining rings affixed to the drive shafts draws the shafts into the coupler. A retaining bolt may be tightened to force the shafts into the coupler. A method for manufacturing the spline coupling consists of a cutting a groove in the drive shafts for a retaining ring. Tapered splines are cut onto the drive shafts. A tapered bore in the coupler is cut on a lathe by a boring bar. Splines in the coupler are created by use of a broaching tool. After the retaining rings are placed on the drive shafts, a retaining bolt tightens the assembly.

1 Claim, 4 Drawing Sheets

METHOD FOR MAKING A SHAFT COUPLING WITH TAPERED SPINES FOR A PULL-TYPE FORAGE HARVESTER

This is a division of application Ser. No. 09/722,963, filed Nov. 27, 2000 now U.S. Pat. No. 6,381,933.

BACKGROUND OF INVENTION

1. Field of Art

This invention relates to the improvement of an agricultural harvesting machine. More specifically it relates to an improvement to the drive shaft on a pull-type forage harvester.

2. Description of Prior Art

Pull type forage harvesters have been used in farming operations for decades. The forage harvester is designed to cut and process crops so that livestock can consume the crop material. The pull-type forage harvester is towed and powered by a conventional agricultural tractor. As the harvester is pulled across a field, it receives crop into its header. The crop is then passed into the cutterhead. The cutterhead chops the crop material into lengths that are desirable to various farm animals. In some machines the crop material is further passed through a corn processor that crushes and opens corn kernels. The crop material is next dropped in an auger trough. The auger in the trough pushes the crop material to a blower. The blower forces the crop material through the blower chute. The chute directs the crop material into an appropriate container for transport. As previously mentioned, the harvester is pulled by a tractor by means of a pivot tongue. Rotational power is transmitted from the power-take-off (PTO) of the tractor to a gearbox on the forage harvester by means of a drive shaft or drive line positioned proximate to the pivot tongue. As the complexity of the forage harvesters has grown, new problems associated with the transmission of the power have also grown. Previously, some drivelines were only 6 feet in length. With newer machines, it is common for the driveline to extend at least 10 feet. However, drivelines are difficult to manufacture. Increasing the length of a driveline results in more expensive manufacturing methods and machinery. A means to couple several of the drive lines together without loss of the rotational energy and with a minimum of support structure would be a great improvement.

The prior art illustrates these and other difficulties. U.S. Pat. No. 2,255,634 illustrates a flange union that couples two shafts. Unfortunately, it is necessary to clamp the flange tightly. Considerable stress is placed on the clamping bolts. U.S. Pat. No. 4,598,677 illustrates an arrangement of auxiliary equipment units for internal combustion engine automotive vehicles. In this design it is necessary for the coupler to be held in position by a seal and a set of bearings. This increases the costs and risk of coupler failure.

Consequently, the need exists for improved mechanisms for joining the various drive shafts with a minimum of supports that ensures that the rotation power from the PTO is transmitted to the harvester.

OBJECTS OF THE INVENTION

It is an object of the present invention to provide a shaft coupler for the drive shaft of a forage harvester.

It is a further object of the present invention to provide a coupler that is not supported by any structure besides the drive shaft.

It is a further object of the present invention to provide a shaft coupler that is simple and inexpensive to build and maintain.

It is a further object of the present invention to provide a shaft coupler that transmits the rotational power of the tractor PTO to forage harvester without loss.

It is a further object of the present invention to provide a method of constructing and assembling a shaft coupler.

SUMMARY OF THE INVENTION

The invention overcomes the deficiencies of the prior art. The invention is an improvement to the driveline on a pull type forage harvester. The invention consists of a set of first tapered splines on a first drive shaft and a set of second tapered splines on a second drive shaft. The first and second tapered splines are inserted into an internally splined, tapered coupler with a gap at the center. To maintain the splines in mated contact; a retainer is affixed onto each drive shaft by means of a first retaining ring. Retaining bolts may be used to draw the shafts into the coupler. A method for constructing the invention consists of cutting a groove into each drive shaft for a retaining ring. A tapered hobbing tool is used to cut splines into the drive shaft. A boring bar is used in conjunction with a lathe to cut a tapered bore into the coupler. A broaching tool is used to cut the internal splines for the coupler.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE INVENTION

Figure 1:
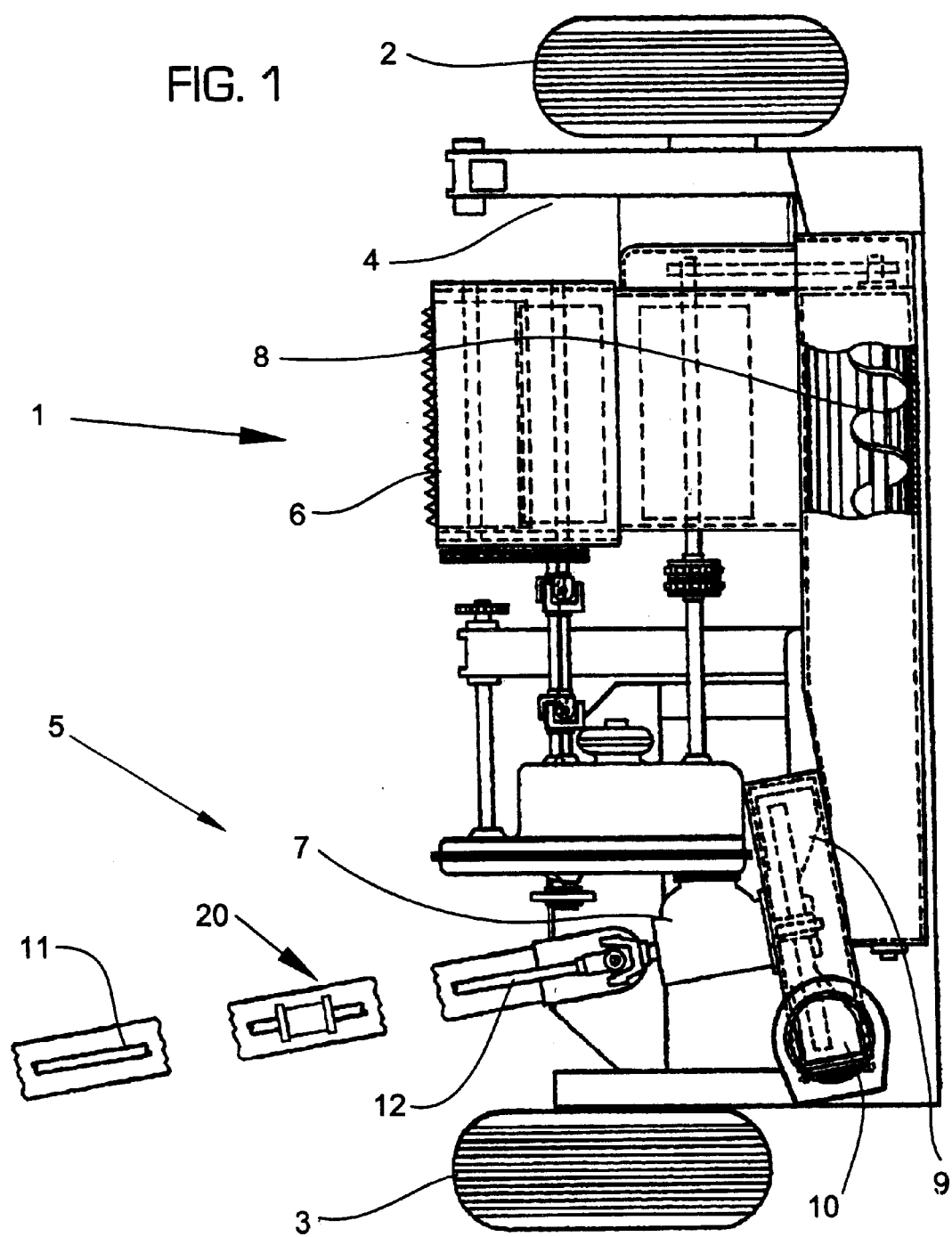
FIG. 1 is an overall plan view of the forage harvester showing general elements of a forage harvester and the general position of the present invention.

Referring to the drawings, it is possible to observe the major elements and general operation of the present invention. Left and right references are used as a matter of convenience and are determined by standing at the rear of the forage harvester and facing the forward end in the normal direction of travel. Likewise, forward and rearward are determined by normal direction of travel of the tractor or forage harvester. Upward or downward orientations are relative to the ground or operating surface. Horizontal or vertical planes are also relative to ground.

FIG. 1 illustrates a conventional pull-type implement or a forage harvester incorporating the present invention. The conventional forage harvester 1 consists of a frame 4 supported by a right tire 2 and left tire 3. A pivot tongue 5 pulls the forage harvester 1 and is attached to an agricultural tractor (not shown). Also connected to the tractor is the drive shaft 11 and 12. The drive shaft consists of a first drive shaft 11 that is connected to the power-take-off (PTO) of the tractor. The first drive shaft 11 is affixed to the second drive shaft 12 by a shaft coupling 20. The second drive shaft 12 is connected to a gearbox 7. The gearbox 7 provides rotational power to the various components of the forage harvesters by belts, shafts or chains. These items are well known in the art. The gearbox 7 transmits power to the cutterhead 6 and to an auger 8. The gearbox 7 also provides power to the blower 9. In operation, the cutterhead 6 receives the crop from the header (not shown) and cuts the crop into small pieces. The crop is then deposited into an auger trough and pushed by an auger 8 into the blower 9. The blower 9 pushes the crop through the blower chute 10. The crop is ejected from the blower chute 10 into an appropriate container (not shown). Previously, forage harvesters had a shorter pivot tongue 5—typically 5–6 feet length. However, larger and wider tractors demand a longer pivot tongue so as to maintain a proper turning radius at the headlands of fields. Increasing the length of pivot tongue solves this issue, but necessitates a longer drive shaft. Unfortunately, most manufacturing for drive line envisions a 6 foot long shaft. The additional length would require newer manufacturing tools and techniques. The shaft coupler 20 allows for a simple connection between the first drive shaft 11 and second drive shaft 12.

Figure 2:
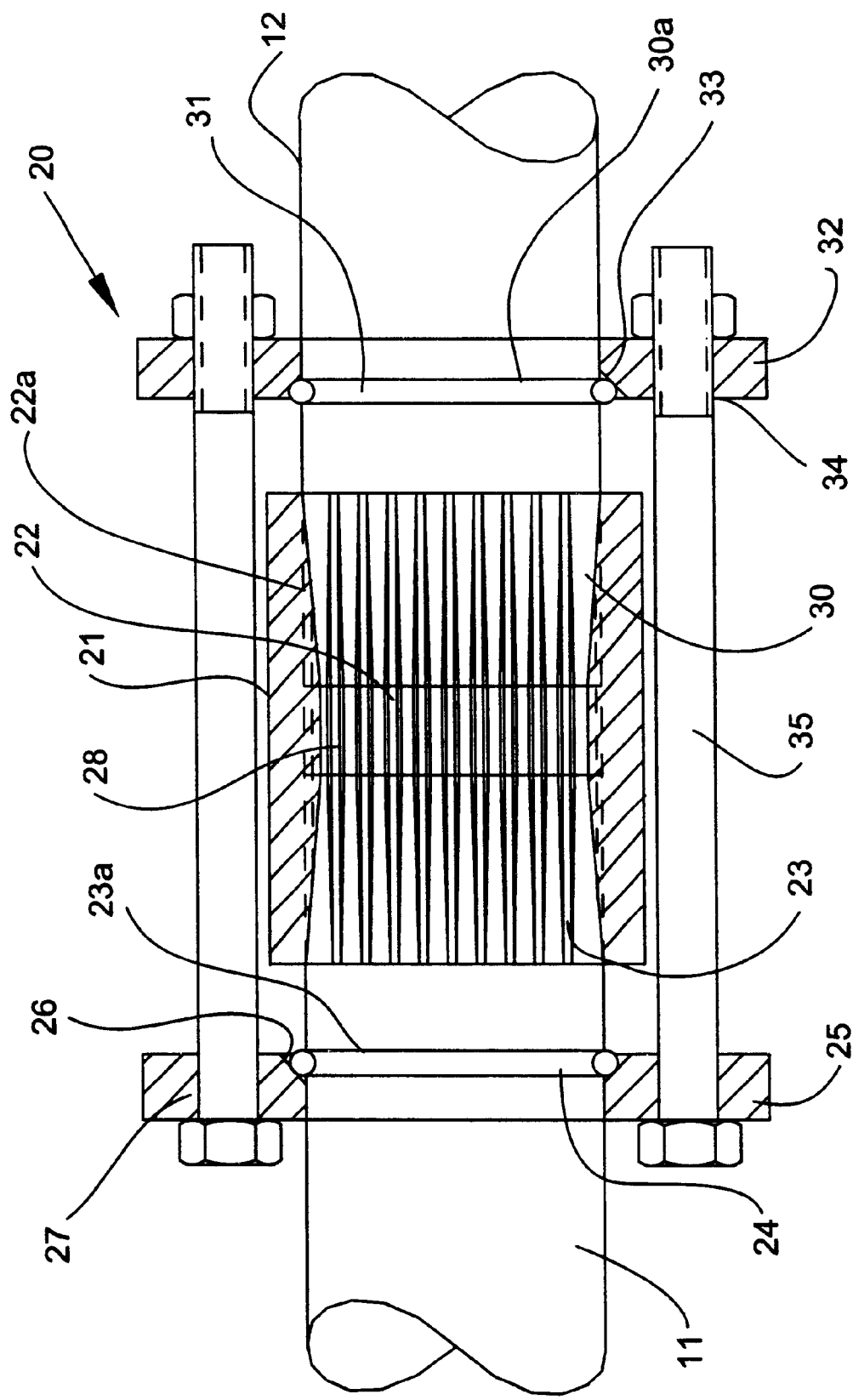
FIG. 2 is an enlargement of the shaft coupling from figure to more clearly show the structure of the specific invention.
Figure 3:
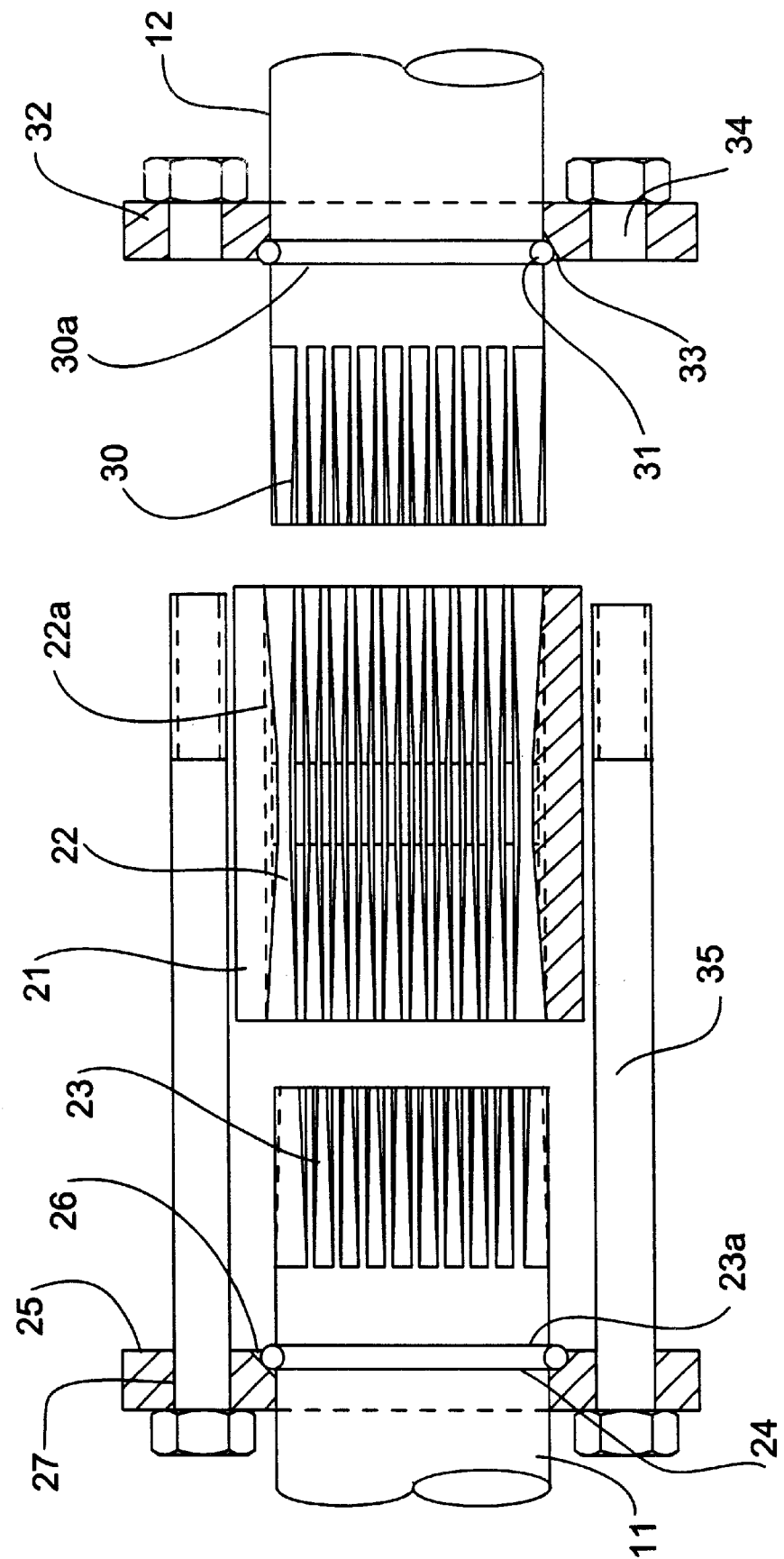
FIG. 3 is an exploded view of FIG. 2 to illustrate the structure of the present invention.
Figure 4:
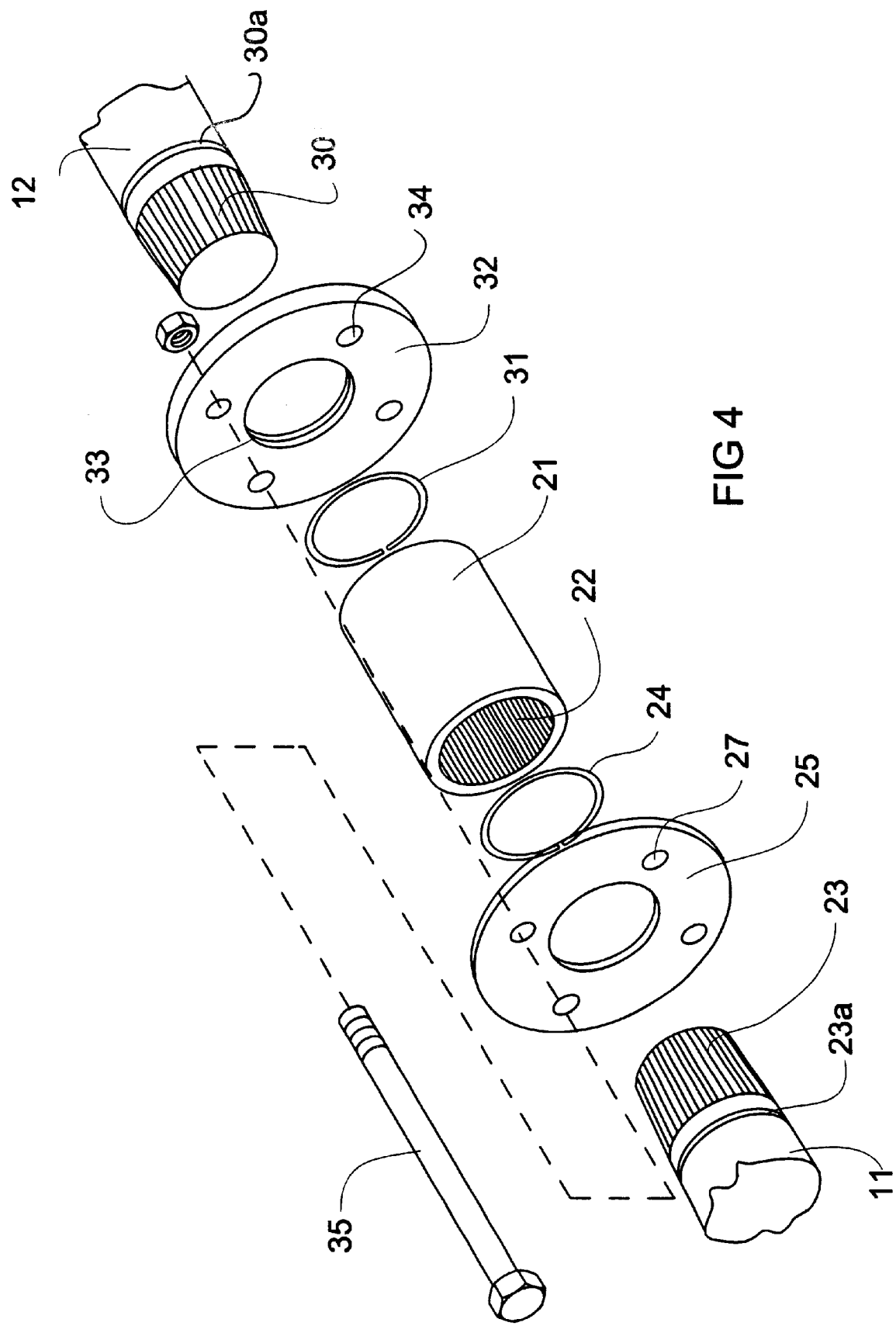
FIG. 4 is an exploded view of the present invention.

The shaft coupler 20 consists of a tapered coupler 21 as well as several other elements. As seen in FIGS. 2 and 3, the tapered coupler 21 is cylindrically shaped. The interior of the tapered coupler 21 has internal splines 22. Each end of the tapered coupler 21 has a tapered bore 22a. The taper increases such that the center of the coupler 21 has a narrower internal diameter, as opposed to a wider diameter at the ends of the coupler 21. As seen in FIG. 2, the gradual tapering of the bore creates a gap 28 as seen in FIG. 2.

Each drive shaft is also tapered so as to mate with the tapered coupler 21. The end of the first drive shaft 11 has a series of first tapered splines 23. Conversely, the second drive shaft 12 has a series of second tapered splines 30. The first taper splines 23 and second tapered splines 30 mesh with the internal splines 22 of the tapered coupler 21.

The first drive shaft 11, second drive shaft 12 and coupler 21 are held in position by means of a pair of retainers and retaining rings. Specifically, a first retaining ring 24 is affixed in the first groove 23a on the first drive shaft 11. A first retainer 25 has a first recessed area 26 that contacts the first retaining ring 24. Likewise, a second retaining ring 31 is affixed in the second groove 30a on the second drive shaft 12. The second retainer 32 contacts the second retaining ring 31 at its second recessed area 33. A series of retaining bolts 35 are inserted in the first bolt aperture 27 on the first retainer 25 and a second bolt aperture 34 on the second retainer 32. By tightening the retaining bolt 35, the first retainer 25 and second retainer 32 pull the first drive shaft 11 and second drive shaft 12 into the tapered coupler 21 and into a mated position. The tapered drive shafts 23, 30 and internal splines 22 ensure that the coupler may be periodically re-tightened without damage to the drive shafts 11 and 12.

The shaft coupling 20 has the additional advantage that it may be manufactured using existing techniques well know in the art. First, a groove (23a or 30a) about a half the depth of the retaining rings (24 or 31) is cut into the drive shafts (11 or 12). Then a tapered hobbing cutter is used to cut the tapered splines into the drive shafts. The slope of the taper is approximately ⅛ inch per foot. The retaining rings 24 and 31 are forced into their respective groove on the drive shaft. To manufacture the coupler 21, a boring bar is used on a lathe to shape a tapered bore. As previously discussed, the diameter of the coupler is greater at the ends and tapers gradually towards the center. To cut the internal splines 22, a broaching tool is drawn through the tapered bore, cutting the splines. After the retainers 25 and 32 are placed onto the drive shafts, the retaining bolts are used to draw the drive shafts into the coupler. The splines 23 and 30 on the drive shafts are drawn into the internal splines 22. The tapered nature of the drive shafts and tapered coupler 21 ensures that the rotational power of the first drive shaft is transmitted to the second drive shaft. If necessary, the coupling may be periodically tightened. The gap at the center of the coupler 21 prevents drive shafts 11 and 12 from contacting each other prior to the mater position.

It will be obvious to those skilled in the art that various changes may be made without departing from the scope of the invention and the invention is not to be considered limited to what is illustrated in the drawings and described in the specification.

What is claimed is:

1. A method of constructing a coupler having a tube for receiving a first and second drive shafts of a pull-type forage harvester comprising the steps of:

a. grooving the first drive shaft and the second drive shaft for a retaining ring;

b. cutting a plurality of tapered splines into the first drive shaft and the second drive shaft;

c. creating a tapered bore in the tube; and d. cutting a plurality of internal splines in the tube;

e. affixing a first retaining ring into the groove in the first drive shaft and affixing a second retaining ring into the groove in the second drive shaft;

f. placing a first retainer into contact with the first retaining ring and placing a second retainer into contact with the second retaining ring;

g. inserting the first tapered splines and the second tapered splines in to the coupler;

h. inserting a retaining bolt into the first retainer and the second retainer; and i. tightening the retaining bolt.

* * * * *